United States Patent

[11] 3,621,271

[72] Inventor Carl J. Snyder
Raleigh, N.C.
[21] Appl. No. 1,588
[22] Filed Jan. 9, 1970
[45] Patented Nov. 16, 1971
[73] Assignee Westinghouse Electric Corporation
Pittsburgh, Pa.

[54] LOAD REGULATION APPARATUS
6 Claims, 3 Drawing Figs.
[52] U.S. Cl. .................................................. 307/38
[51] Int. Cl. .................................................. H02j 3/14
[50] Field of Search ......................................... 307/38, 30,
11, 35, 31, 85, 86, 87, 57, 52, 59, 62, 39, 40

[56] References Cited
UNITED STATES PATENTS
3,408,503   10/1968   Wyman et al. ................ 307/38

Primary Examiner—Herman J. Hohauser
Attorneys—A. T. Stratton and C. L. Freedman

ABSTRACT: A demand arm is located relative to a dial by means of a step motor in accordance with the difference between the rate at which electric energy is consumed during a demand interval and a base rate of energy consumption which should not be exceeded. Electric switches are distributed along the path of the demand arm for operation by the arm for shedding and adding load when the rate of energy consumption exceeds or drops below a desirable level.

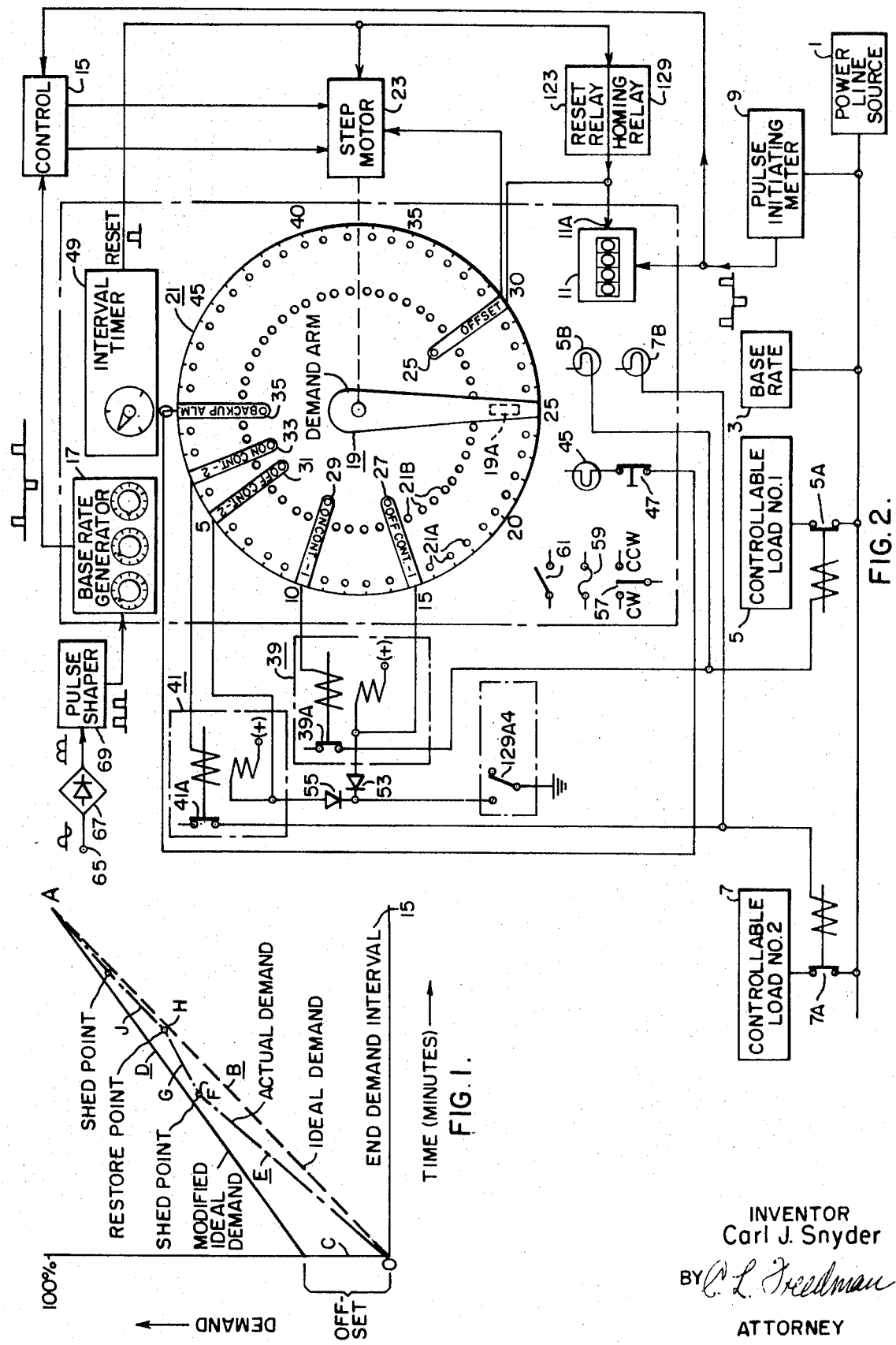

LOAD REGULATION APPARATUS

BACKGROUND OF THE INVENTION

1. Field of the Invention

This invention relates to the regulation and control of load and it has particular relation to the maintenance of electric loads within the limits on which contract demand rates are based.

The invention can be applied to the control of the flow of various quantities such as gas or liquids, particularly those which can be measured in digital form. It is particularly suitable for systems supplying electrical energy to loads and will be described as applied to such a system.

2. Description of the Prior Art

It is conventional practice to establish by contract a maximum demand rate for consumers of electric energy. This rate may be based on a demand interval such as 15 or 30 minutes. If the consumer exceeds the maximum demand established for any demand interval, he is subject to an increased rate or penalty.

In many cases a consumer's load may be divided into a base load and a controllable load. The base load should not be dropped. Examples of these loads are lighting loads and some industrial processes. A controllable load may be dropped for part of a demand interval without inconvenience. Examples of controllable loads are air-conditioning and heating loads.

In order to minimize the possibility of a consumer being subjected to an increase in rate or penalty, load regulation systems have been developed which shed controllable load under conditions such that a maximum demand is likely to be exceeded. The system may be arranged to restore the load if such restoration is unlikely to result in exceeding the maximum demand. A sophisticated system of this type is shown in the U.S. Pat. No. 3,296,452 which issued Jan. 3, 1967.

SUMMARY OF THE INVENTION

In accordance with the invention a demand arm is rotated relative to a dial in accordance with the difference between a base rate of energy consumption and the actual rate of energy consumption. In a preferred embodiment of the invention the demand arm is rotated by pulses which represent the base rate in a first direction and by pulses which represent the actual energy consumption in a second direction preferably by a step motor.

Adjustable control points are distributed around the path of the demand arm. Switches at these control points are operated by the demand arm for the purpose of shedding and restoring controllable load for the purpose of maintaining the actual demand below but as close as possible to the base rate.

BRIEF DESCRIPTION OF THE DRAWINGS

FIG. 1 is a graphic representation showing ideal and actual demands for a variable quantity;

FIG. 2 is a schematic representation in single line block form of a load regulation system embodying the invention.

DESCRIPTION OF THE PREFERRED EMBODIMENTS

Figure 3:
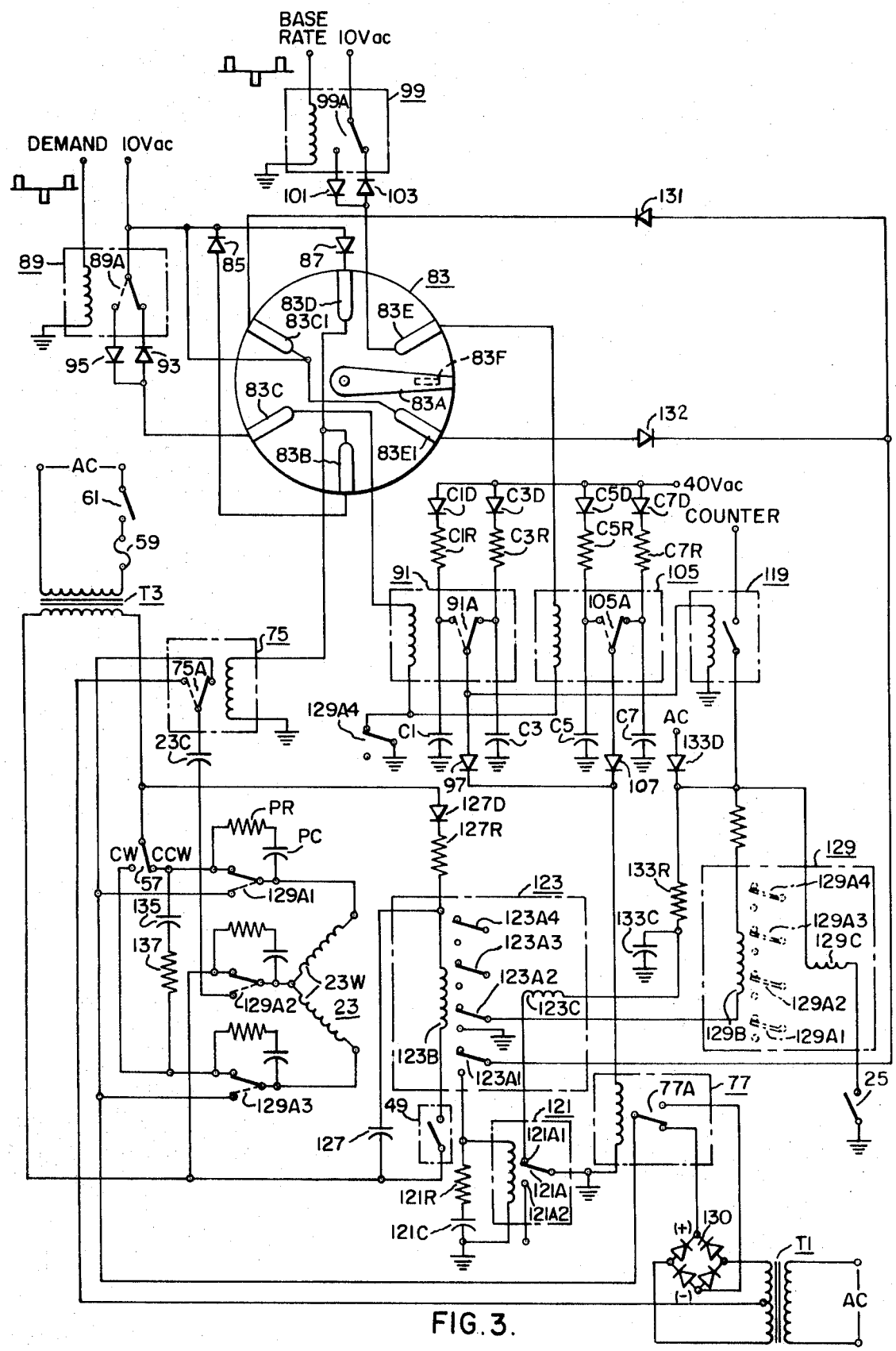
FIG. 3 is a schematic representation showing circuits suitable for components illustrated in FIG. 2.

Referring to the drawings, FIG. 2 shows a source of electric energy 1 which may be a single-phase or a polyphase source of any power frequency. For present purposes it will be assumed that the source is a three-phase source operating at a power frequency of 60 Hertz. This source supplies electric energy to a base load 3 and two controllable loads 5 and 7. The controllable loads 5 and 7 are connected to the powerline source through load switches 5A and 7A which may be operated electrically to their open conditions.

In order to measure the electric energy supplied to the load, a conventional pulse-initiating meter 9 is provided which generates pulses at a rate dependent on the consumption of electric energy by the loads. The pulse-initiating meter may provide pulses of one polarity or it may provide pulses which alternate in polarity. For present purposes it will be assumed that the pulse-initiating meter has a conventional three-wire output providing pulses which alternate in polarity.

The output of the pulse-initiating meter 9 is supplied to a conventional demand receiver having a register which is reset to zero at the end of each demand interval. For present purposes it will be assumed that a demand interval of 15 minutes is employed. The demand receiver has a reset terminal 11A to which a reset pulse is applied at the end of each 15-minute interval.

In FIG. 1, several demand curves are plotted on Cartesian coordinates in which abscissas represent time and ordinates represent demand. At the end of a 15-minute demand interval the demand should not exceed the maximum demand A which is set by a contract provision. The curve B represents an ideal demand in which the demand increases in a linear manner from the zero point of the graph to the level A.

Because of the division of the loads into base and controllable loads, in practice it is desirable to employ a modified ideal demand or reference curve which has an offset portion C and a slope portion D. The offset portion C represents a demand corresponding to the base load 2 of FIG. 2. A portion D extends linearly from the upper end of the offset portion C to the point A.

Let it be assumed that at the beginning of a demand interval the actual demand is represented by a curve E which has a slope greater than the slope of the portion D. At the point F it becomes apparent that if the actual demand continues at the same rate the curve E will cross the modified ideal demand curve which may be termed the base rate. The load switch 5A is opened at this point to deenergize the controllable load 5 of FIG. 2. The actual demand now continues along the curve G away from the curve portion S. At the point H the displacement between the curve G and the curve portion D is such that it is reasonable to restore the controllable load 5 for energization and the switch 5A consequently is reclosed to establish an actual demand curve J.

It should be noted that the actual demand curves approximate the modified ideal demand and may terminate approximately at the same point A. If the opening of the load switch 5A is insufficient to prevent crossover of the actual and ideal demand curves, the load switch 7A may be subsequently opened in a similar manner in an effort to prevent the consumer from exceeding his contract demand.

In order to operate the load switches 5A and 7A in a manner discussed above, the pulses generated by the pulse-initiating meter are also applied to a control 15. In addition, ideal or base rate pulses are generated by a base rate generator 17 at an adjustable rate. These pulses all may have the same polarity but in the present embodiment the pulses alternate in polarity. The pulses from the generator 17 are also applied to the control 15.

A demand arm 19 is rotated relative to a dial 21 in accordance with the difference between the demand pulses supplied to the control 15 by the pulse-initiating meter 9 and the base rate pulses supplied by the base rate generator 17 to the control 15. In a preferred embodiment of the invention the location of the arm 19 is determined by a step motor 23 which moves the demand arm 19 in one direction such as the clockwise direction one step for each pulse received from the pulse-initiating meter 9. The step motor moves the demand arm one step in the opposite direction, in this case the counterclockwise direction, for each pulse received from the base rate generator 17. The parameters may be such that 50 steps in one direction correspond to one revolution of the demand arm 19.

At adjustable positions in the path of the demand arm 19, the dial 21 carries control switches 25, 27, 29, 31, 33 and 35. In a preferred embodiment of the invention these switches are magnetically operated reed switches which are plugged into holes 21A and 21B provided in the dial 22. The demand arm 19 carries a permanent magnet 19A which operates a switch when the demand arm rotates to a position adjacent such switch.

The switch 25 is an offset switch which controls the length of the portion C of the modified ideal demand curve of FIG. 1.

Switches 27 and 29 control a bistable magnetic latching relay 39 which in turn controls the load switch 5A. Such a relay has a latching coil and a reset or release coil. The position the contacts normally assume after completion of a reset operation may be referred to as normally closed. This follows energization of the reset or release coil. Energization of the other coil switches the relay to the opposite or normally open state. One of the control switches actuates the relay 39 to disconnect the controllable load 5 from the source 1. The other control switch operates the relay 39 for the purpose of restoring the energization of the controllable load 5. For present purposes it will be assumed that the control switch 29 when actuated closes the relay contacts 39A whereas the control switch 27 opens the relay contacts 39A.

In a similar manner, the control switches 31 and 33 control a latching relay 41 for the purpose of controlling the load switch 7A. The switch 35 is backup alarm switch. When this switch closes it energizes a backup alarm 45 which may be a lamp or a buzzer or both. The alarm remains energized until it is reset manually by an alarm reset 47.

At the end of each demand interval, an interval reset pulse is generated by an interval timer 49. This reset pulse controls a bistable magnetic latching relay 123, which assists in the control of a bistable magnetic latching homing relay 129. The homing relay cooperates with the offset switch 25 for the purpose of resetting the demand arm 19 to the offset or home position determined by the offset switch. The relay 123 also participates in the reset control of the demand receiver 11 for the purpose of resetting the register of the demand receiver to zero.

The relay 129 has contacts 129A4 which complete through rectifiers 53 and 55 circuits for the release coils of the latching relays 39 and 41. Consequently, if the latching relays 39 and 41 are not released by operation of the demand arm before the end of the demand interval the reset pulse initiates releases of these relays to assure connections of the controllable loads 5 and 7 to the source at the beginning of a succeeding demand interval.

The resetting direction of the demand arm 19 may be selected by a manually operated switch 57. The switch may be operated from a position CW representing clockwise rotation of the demand arm to a position CCW representing counterclockwise rotation of the demand arm during a resetting operation. Thus the shortest resetting direction may be selected. A protective fuse 59 and a power on-and-off switch 61 are also illustrated for the device.

As previously pointed out the base rate generator 17 is adjustable for the purpose of permitting adjustment of the rate of pulse generation. The number of pulses per interval is equal to the maximum allowed by the peak demand or the contract maximum demand less the pulses allowed for zero offset and also less a small number as a reserve. In one embodiment the pulses were adjustable between a setting of 1 second per pulse and 8.325 per pulse.

In a preferred embodiment the base rate generator is energized from a terminal 65 which is energized from a source of alternating current having a frequency of 60 Hertz. The alternating input is rectified in the full-wave rectifier 67 and the rectified pulses are applied to a suitable pulse shaper 69 which desirably may be a Schmitt trigger squaring circuit.

The base rate generator 17 is adjusted to count a predetermined number of the pulses supplied by the pulse shaper 69. When this number is reached a pulse is generated by the generator 17 and the generator is reset to zero preparatory to the start of another count of the desired number of pulses from the pulse shaper.

The conditions of the controllable loads 5 and 7 are shown by suitable indicators 5B and 7B which may be in the form of lamps. Thus, when the relay 39 closes to open the load switch 5A it also connects the lamp 5B for energization.

As shown in FIG. 3 the step motor 23 is of a standard type employing windings 23W and a phasing capacitor 23C which determines the direction of stepping of a motor or a phasing capacitor 135 which determines resetting direction. The stepping direction is determined by a bistable polarized relay 75 which has contacts 75A. When the movable one of the contacts 75A is in the position illustrated (engaging the right-hand fixed contact) it connects the phasing capacitor 23C for counterclockwise stepping of the step motor. When the movable contact is moved to the position shown in dotted lines the phasing capacitor is connected for clockwise stepping of the step motor 23.

To step the step motor 23 a step relay 77 is momentarily energized to connect momentarily the step motor 23 through the direction relay 75 to a source of direct current represented by a rectifier 130 energized from a transformer T1 through closed contacts of a homing relay 129 (contacts 129A1, 129A2 and 129A3 are in their dotted line positions). For each pulse the relay 77 briefly connects its movable contact to the negative terminal of the rectifier 130 and then returns the contact to the positive terminal. With the center-tapped secondary of the transformer T1, this contact operation reverses the polarity applied to the step motor for each contact movement. For each contact movement, the motor may step 3.6° or a total of 7.2° for each pulse cycle. When the homing relay 129 is operated to its other position the step motor is connected to a source of alternating current represented by a transformer T3 for the purpose of resetting the motor rapidly to its home position as determined by the offset switch 25. It will be noted that the phasing capacitor 135 is connected across the motor windings through a resistor 137. The switch 57 controls the direction of reset.

Certain of the contacts (e.g. see contacts 129A1) may have a protective capacitor PC connected thereacross through a resistor PR.

Demand pulses and base rate pulses are sequentially effective for stepping the step motor 23 through a scanning technique which preferably employs a commutator 83. The commutator 83 in a preferred embodiment includes a commutator arm 83A which rotates at a predetermined constant rate, such as 60 revolutions per minute, about an axis. Six commutating switches 83B, 83C, 83C1, 83D, 83E and 83E1 are positioned symmetrically about the axis of rotation of the arm 83A for successive operation by the arm as it rotates. Desirably the switches are magnetically operated reed switches and the arm 83A carries a permanent magnet 83F for operating the switches.

Diametrically opposite switches 83B and 83D control the direction of the step motor 23. Thus when the arm 83A moves adjacent the reed switch 83B, the switch closes and connects the operating coil of the bistable polarized relay 75 across a source of alternating current through a rectifier 85. When such a relay is energized in one direction the movable contact remains in the corresponding position until the relay is energized in the opposite direction. The rectifier is so poled that the polarized relay operates the movable contact 75A into its dotted-line position to connect the step motor for clockwise rotation. The movable contact remains in this position until the relay 75 is energized with reverse polarity. When the arm 83A reaches the reed switch 83D this switch closes its contacts to connect the operating coil of the polarized relay 75 across the source of alternating current through a rectifier 87 which is polarized to move the movable contact 75A to its full line position. This prepares the step motor for counterclockwise rotation.

The demand pulses are applied to the operating coil of a bistable polarized relay 89 having contacts 89A. A demand pulse of one polarity actuates the coil of the relay to move the movable one of the contacts 89A to the position shown in full lines, in FIG. 3. A demand pulse of opposite polarity actuates the movable contact to the position shown in dotted lines in this figure.

When the commutator arm 83A reaches the switch 83C and closes the switch, the operating coil of a bistable polarized relay 91 is connected across a source of alternating current 10 VAC through the relay contacts 129A4 and switch 83C and through the movable one of the contacts 89A. The energizing circuit for the operating coil also includes one of the two oppositely poled rectifiers 93 or 95 depending on the position of the movable arm of the contacts 89A. Thus the position of the movable contact of the polarized relay 91 depends on the position of the movable contact of the lol switch 83C closes.

When the movable one of the contacts 91A is in the position shown in full line in FIG. 3, it connects a capacitor C3 across the operating coil of the step relay 77 through a rectifier 97. Thus, if the capacitor C3 is charged at the time of such connection the relay 77 is momentarily picked up to produce a stepping operation of the step motor 23. When the movable contact of the relay 91 occupies its dotted line position in FIG. 3, a capacitor C1 is similarly connected across the operating coil of the relay 77 through the rectifier 97.

The capacitor C1 is charged from an alternating-current source 40 VAC through a resistor C1R and a rectifier C1D. The capacitor C3 is similarly charged through a resistor C3R and a rectifier C3D.

A bistable polarized relay 99 having contacts 99A is operated in accordance with base rate pulses in a manner similar to the operation of the polarized relay 89 by the demand pulses. The movable one of the contacts 99A coacts with two rectifiers 101 and 103 and the reed switch 83E to control a bistable polarized relay 105 in a manner similar to the control of the polarized relay 91 through the contacts 89A, the rectifiers 93 and 95 and the switch 83C. The contacts 105A of the polarized relay 105 successively connect the capacitors C5 and C7 across the operating coil of the relay 77 through a rectifier 107 in a manner similar to the connection of the capacitors C1 and C3 through the contacts 91A and the rectifier 97. The capacitor C5 is charged from the alternating-current source 40 VAC through a resistor C5R and a rectifier C5D. Similarly the capacitor C7 is charged from the alternating-current source through a resistor C7R and a rectifier C7D.

In operation let it be assumed that the commutator arm 83A is approaching the switch 83B in a clockwise direction and that it finally closes the switch. This connects the operating coil of the polarized relay 75 across an alternating-current source through the rectifier 85 and operates the movable contact of the relay 75 to its dotted-line position thus preparing the step motor 23 for clockwise rotation or stepping.

The arm 83A then moves sufficiently to close the switch 83C. This connects the operating coil of the polarized relay 91 across an alternating-current source through the rectifier 93. If the movable contact of the relay 89 has not moved since its last interrogation by the commutator the polarized relay 91 does not change state and the capacitor C3 continues to be connected across the coil of the relay 77. Inasmuch as the capacitor is discharged the relay 77 mor deenergized. The resistor C3R does not pass sufficient current to pick up the relay 73.

Let it be assumed that since the last interrogation of the movable contact of the relay 89 a demand pulse has been received and has operated the movable contact from its dotted line position to the position shown in full line. Because of this change in state of the relay 89 a corresponding change in state now takes place in the polarized relay 91 and the movable one of the contacts 91A is moved to connect the capacitor C1 across the coil of the relay 77. Inasmuch as the capacitor C1 is charged it applies a pulse through the rectifier 97 to the coil for the purpose of picking up momentarily the relay 77 and causing the step motor to take one step in a clockwise direction.

The arm 83A next reaches and operates the switch 83C1 which is employed in a resetting sequence which will be discussed below.

The arm 83A continues its rotation until it reaches the switch 83D. This switch closes to connect the coil of the relay 75 through the rectifier 87 for the purpose of causing a change in state of the relay 75. This relay consequently moves its movable contact to prepare the step motor for counterclockwise rotation.

As the commutator arm 83A continues its rotation it next reaches and closes the switch 83E. This connects the polarized relay 105 for control by the position of the movable contact of the relay 99 in a manner similar to the control of the polarized relay 91 by the position of the movable contact 89A. If the polarized relay 99 has changed state since its last interrogation, the polarized relay 105 operates its movable contact to connect a charged one of the capacitors C5 or C7 to the step relay 77 for the purpose of stepping the step motor 23 in a counterclockwise direction.

Finally, the commutator arm 83A reaches and operates the switch 83E1. As will be discussed below, this switch is employed in a resetting sequence.

This completes one cycle of operation of the commutator 93 and the cycle is repeated continuously at a rate dependent on the rate of rotation of the commutator arm 83A.

The step motor 23 steps in response only to a change in state of the relay 89 or the relay 99. The rate of rotation of the commutator arm 83A is fast enough to assure that two demand pulses or two base rate pulses cannot occur in one cycle or one revolution of the commutator arm 83. The system of FIG. 3 serves as an anticoincidence system which assures response to the step motor 23 to each pulse even though a demand pulse and a base rate pulse should occur at the same time.

FIG. 3 shows a commutator employing one group of six reed switches. In order to reduce the rate of rotation of the commutator arm 83A with a resultant prolongation of the lives of the rotating parts and of the reed switches several similar groups of reed switches may be employed for sequential operation. Let it be assumed that six additional reed switches 83B', 83C', 83C1', 83D'83E' and 83E1' (not shown) are provided which are connected respectively in parallel with the reed switches 83B, 83C, 83C1, 830,83E and 83E1. These switches are distributed angularly and symmetrically about the axis of rotation of the commutator arm 83A for operation by the permanent magnet 83F in the order 83B, 83C, 83C1, 83D, 83E, 83E1, 83B', 83C1', 83D', and 83E' and 83E1'. This reduces the motor speed and the duty cycle on the switches by 50 percent for longer life.

The count and reset pulses for the demand receiver 11 are derived through three relays 119, 121 and 123. These prevent simultaneous count and reset energizations. The count pulses are derived from the relay 119 which has its coil connected across the rectifier 97 and the coil of the relay 77. The counting unit in the demand receiver may be of any suitable type such as one which advances one-half step when the contacts of the relay 119 close and one-half step when the contacts thereafter open.

Turning now to the interval pulses, a capacitor 127 is charged from the source of alternating current represented by the transformer T3 through a rectifier 127D and a resistor 127R. When an interval pulse is generated by the timer 49 the relay latching coil 123B of the relay 124 is connected across the capacitor 127 and is pulsed. This operates the movable members of the relay contacts 123A1 through 123A4 to their lower positions as viewed in FIG. 3.

Closure of the contacts 123A2 pulses the coil 129B of the latching relay 129 to cause the contacts 129A1 through 129A4 to change state. The resultant opening of the previously closed pair of contacts 129A4 interrupts the energizing circuits for the coils of the relays 91 and 105. Consequently, no demand pulses can reach the demand receiver 11 through the relay 119.

Closure of the contacts 123A1 prepares the coil of the bistable polarized relay 121 for energization through the rectifier 131 when the reed switch 83C1 is closed by the magnet 83F. The relay 121 is set so that the current through the rectifier 131 causes the contacts to change state. This energizes the reset coil of the demand receiver. While the relay 121 is so switched the capacitor 133C charges from an alternating-current source through a resistor 133C charges from an alternating-current source through a resistor 133R and a rectifier 133D. A capacitor 121C and a resistor 121R may be connected across the coil of the relay 121 to provide a small delay in dropout.

The reset coil remains energized until the switch 83E1 is closed by movement of the arm 83A through 180° to energize the coil of the relay 121 in the opposite direction through the rectifier 132. The relay contacts then change state again to reconnect the now-charged capacitor 133 across the reset coil 123C to reset the relay 123 to its former state.

As previously noted, when the relay contacts 129A1, 129A2 and 129A3 occupy their full line positions in FIG. 3, they connect the phasing capacitor 135 and its resistor 137 across the windings of the step motor. The center terminal of the windings is connected to one terminal of the secondary of the transformer and the remaining terminal of the secondary is connected to that one of the outer two terminals of the motor windings which is selected by the switch 57. Thus the switch may be operated to select a resetting direction for the motor which assures the shortest and fastest return to the home position. A typical step motor suitable for this application when connected to a 60-Hertz power supply may have a reset speed of 72 revolutions per minute.

The relay 129 is reset when the offset switch 25 is closed by the magnet 19A as the arm 19 reaches its home position. This reconnects the step motor for stepping operation. Moreover the reclosure of the previously open pair of contacts 129A4 causes any demand and base rate pulses received and stored during reset to be effective for producing appropriate stepping of the step motor.

The overall operation of the embodiment shown in FIG. 2 may be summarized as follows. Let it be assumed that the loads 3, 5 and 7 are all connected for energization to the source 1 and that the arm 19 has just been reset to a position determined by the offset switch 25. The step motor now steps the arm 19 in a counterclockwise direction for each base rate pulse received from the base rate generator 17 and in a clockwise direction for each demand pulse received from the pulse-initiating meter 9. It will be assumed further that the base rate pulses define a modified ideal demand as represented by the curve D in FIG. 1 and that the demand pulses are being generated at a rate represented by the curve portion E in FIG. 1. For this pulse relationship the net rotation of the arm 19 is in a clockwise direction.

The net rotation of the arm 19 carries it adjacent the switch 29 at a time corresponding to the point F in FIG. 1. The switch 29 now operates to energize the latching relay 39 for the purpose of actuating the load switch 5A to its open condition. This disconnects the controllable load 5 from the source 1.

The reduction in the effective load results in a reduction in the rate of generation of demand pulses by the pulse-initiating meter 9. The net difference in the demand pulses and in the base rate pulses results in a counterclockwise movement of the arm 19 until at a time represented by the point H in FIG. 1 the arm 19 is adjacent the switch 27. The switch 27 now operates to release the latching relay 39 and this in turn releases the load switch 5A for the purpose of restoring the controllable load 5 for further energization from the source 1.

If the increase effective load due to restoration of the energization of the controllable load 5 is such that the modified ideal demand will be again exceeded during the demand interval the arm 19 operates in the same manner to shed the controllable load 5 and thereafter to restore it if such restoration is called for.

If the shedding of the controllable load 5 is insufficient and the actual demand continues to approach the modified ideal demand, the arm 19 finally reaches the switch 33 which energizes the latching relay 41 to shed the controllable load 7. Should the arm thereafter reach the switch 31, the relay 41 releases to restore the controllable load 7 for energization from the source 1. Shedding of the controllable loads 5 and 7 is indicated by illumination of the lamps 5B and 7B.

Should the excessive demand continue the arm 19 may reach the switch 35 which operates the backup alarm 45.

At the end of the demand interval the interval timer 49 generates a reset pulse which may have a duration of the order of 20 milliseconds. As above noted, this controls the reset of the demand receiver 11 to zero and the release of the latching relays 39, 41 if these are in latched condition for the purpose of assuring restoration of the controllable loads 5 and 7 for energization from the source during the succeeding demand interval.

The reset pulse connects the relay coil 123B (FIG. 13) to be pulsed by the capacitor 127 and to change the state of its contacts 123A1 through 123A4. The contacts 123A1 cause the relay 121 to change state when the commutator 83 is in a favorable position and this resets the demand receiver 11.

The contacts 123A2 cause the homing relay 129 to change state. Contacts 129A1, 129A2, and 129A3 now connect the motor 23 for a rapid homing operation. Contacts 129A4 provide an open circuit which interrupts the circuits for the coils of the relays 91 and 105 to store demand and base rate pulses occurring during reset. These contacts also provide a closed circuit which resets the relays 39 and 41 and the lamps 5B and 7B if necessary assure energization of the loads 5 and 7 at the beginning of the next interval.

The motor 23 moves the arm 19 in the homing direction until the arm closes the offset switch to reset the relay 129. The relay 121 is again pulsed when the commutator 83 rotates 180° and this results in resetting of the relay 123.

This system now is in condition for operation in a similar manner over the next demand interval.

The system also may be arranged to indicate a low-load condition. For example, assume that the two switches 27 and 29 are interchanged. When the arm 19 is adjacent the interchanged switch 29, the lamp 5B would be illuminated to indicate a low-load condition. When the load increases sufficiently for the arm to be brought adjacent the interchanged switch 27, the lamp would be extinguished.

I claim as my invention:

1. In a load-responsive device, reference means for establishing a reference rate for supplying a quantity to a destination, real means for determining the actual rate of supplying a variable quantity to a destination, comparison means for comparing the reference and actual rates, said comparison means comprising a plurality of spaced electric switch means, a reversible motor, motor-actuating means for moving the motor in a direction and to an extent dependent on the difference between the reference and actual rate, and switch-operating means responsive to said motor, scanning said switch means in accordance with the relation between said reference and actual rates, and resetting means for resetting said switch-operating means at intervals to a predetermined condition.

2. A device as claimed in claim 1 wherein said electric switch means comprises magnetically operable reed switches and said switch-operating means comprises an operating magnet movable by said motor in a path passing adjacent each of the reed switches.

3. A device as claimed in claim 1 wherein said comparison means comprises means sequentially reversing the motor direction, stepping the motor in response to a change in state of a first one of the reference and actual rates, reversing the motor direction and stepping the motor in response to a change in state of a second one of the reference and actual rates.

4. A device as claimed in claim 3 wherein said switch means comprises a plurality of magnetically operated reed switches arcuately spaced about a common axis, and an operating magnet mounted for movement by the motor about said axis in a path successively bringing the magnet within operating distance of each of the reed switches.

5. A device as claimed in claim 1, wherein said motor is a step motor, said reference means comprises means for producing electric reference pulses at a predetermined rate, said real means comprises means for producing actual electric pulses at a rate corresponding to the actual rate, said motor-activating means comprising means energizing the motor to step in a first direction for each of said reference pulses and in a second direction for each of said real pulses.

6. A device as claimed in claim 5 wherein said variable quantity is electric energy, said electric switch means comprises a plurality of magnetically operable electric switches distributed angularly about an axis, said switch-operating means comprises a magnet mounted for movement for said motor about said axis in a path extending within operating range of each of said switches successively, and said resetting means is periodically operable for resetting said magnet to a predetermined starting position, and means responsive to the condition of said switches for controlling the energization of electric load by said variable quantity.